Feb. 12, 1957  A. ST. J. BOWIE ET AL  2,780,904
NUT PICKUP DEVICE
Filed March 27, 1953  9 Sheets-Sheet 4
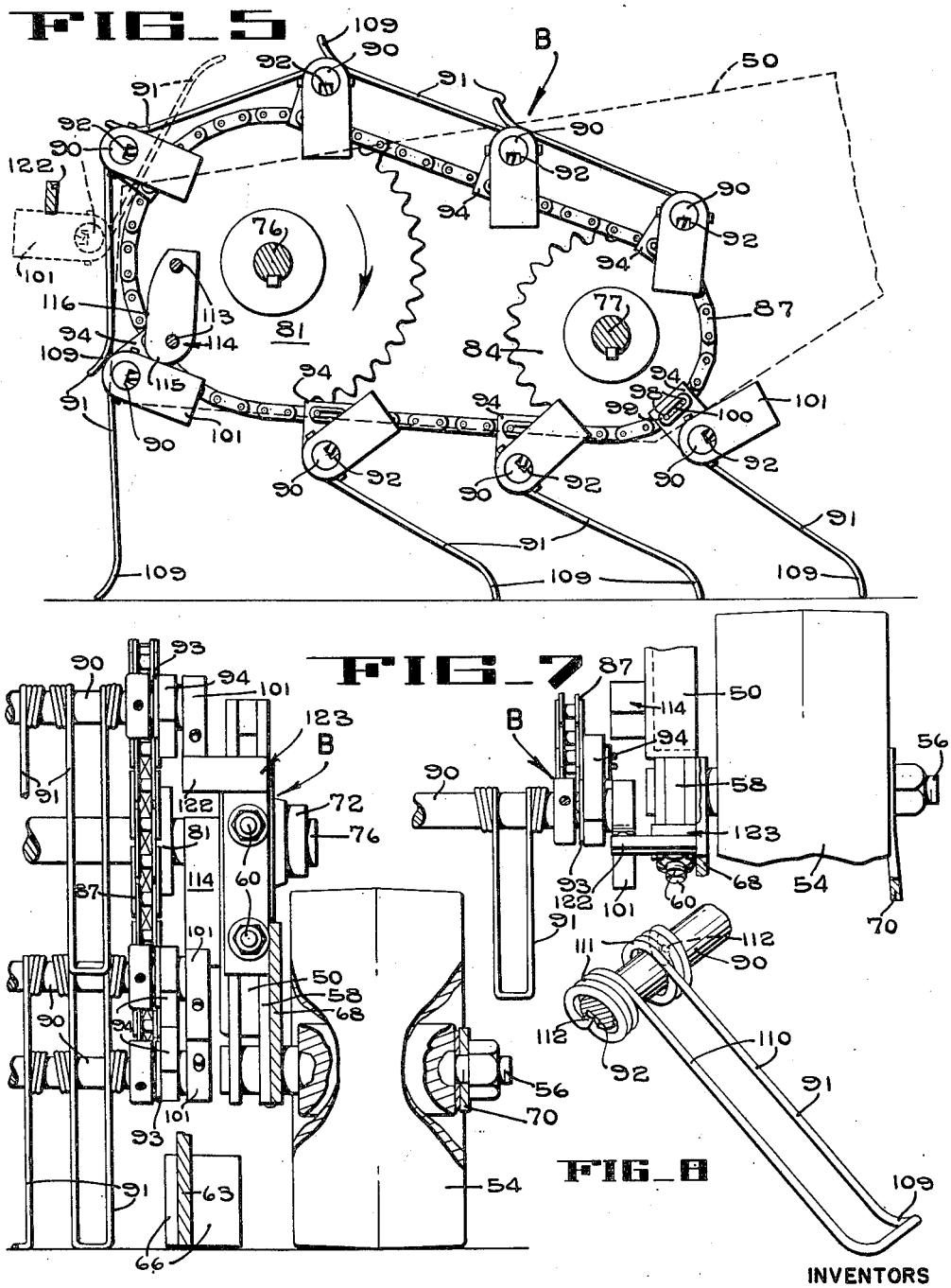
INVENTORS
ADRIAN ST. J. BOWIE
JOHN L. NELSON
BY Hans G. Hoffmeister
ATTORNEY

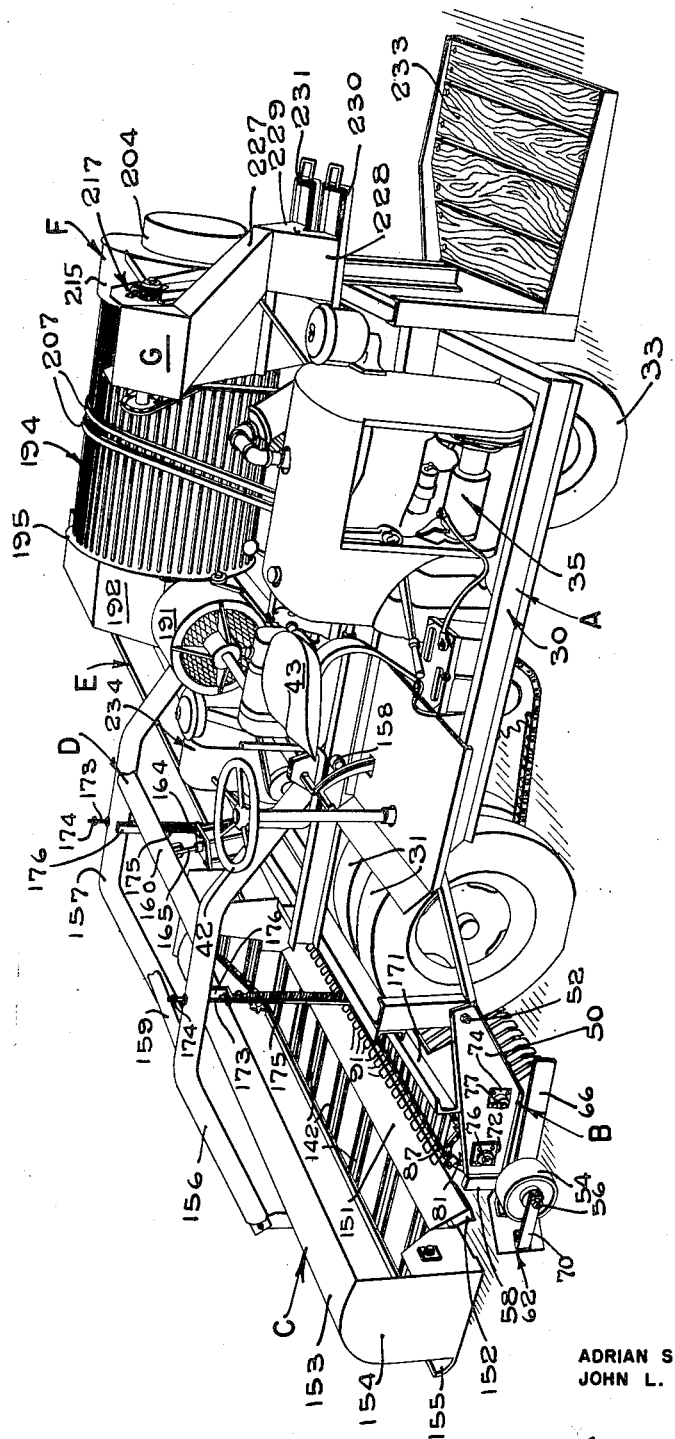

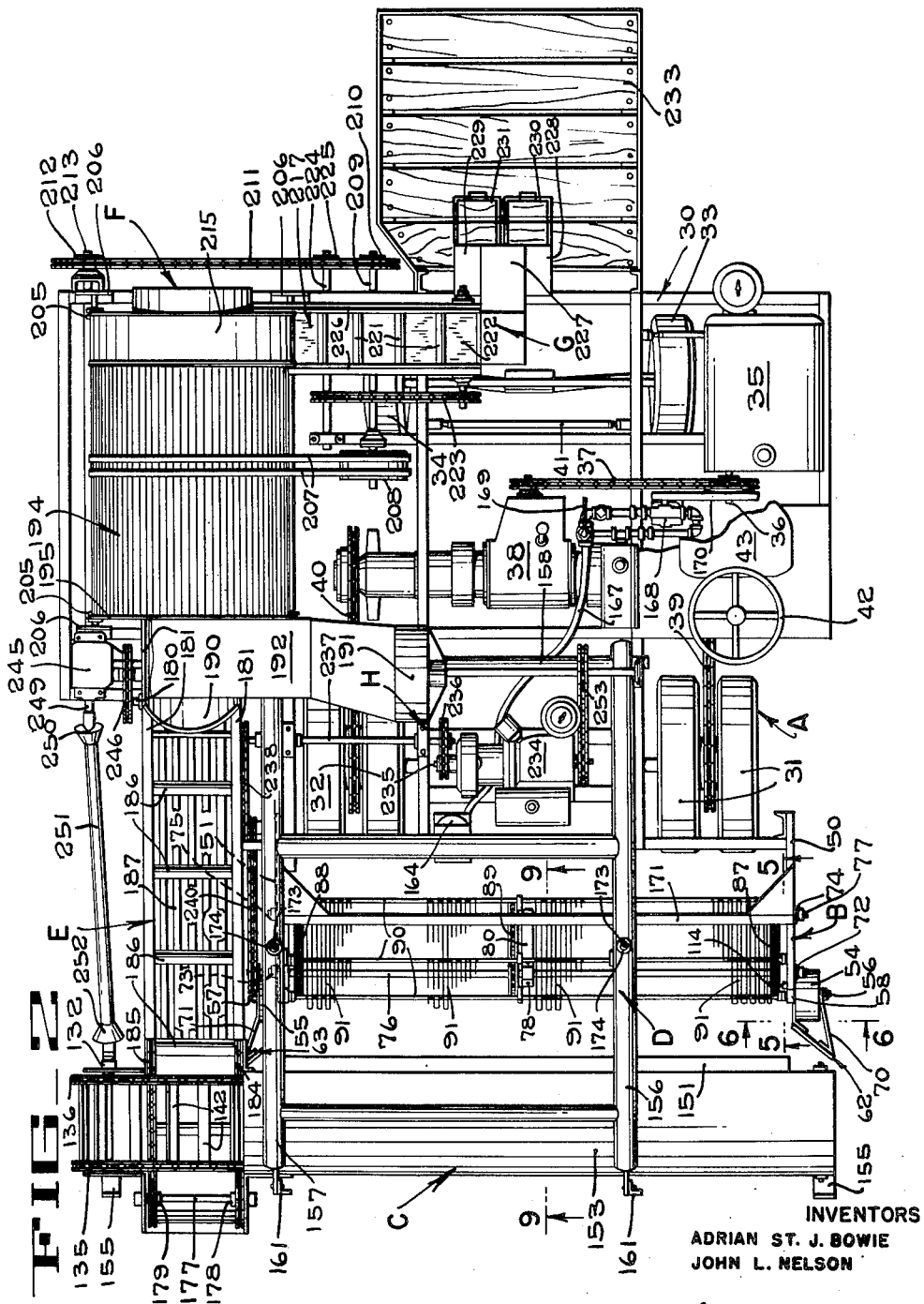

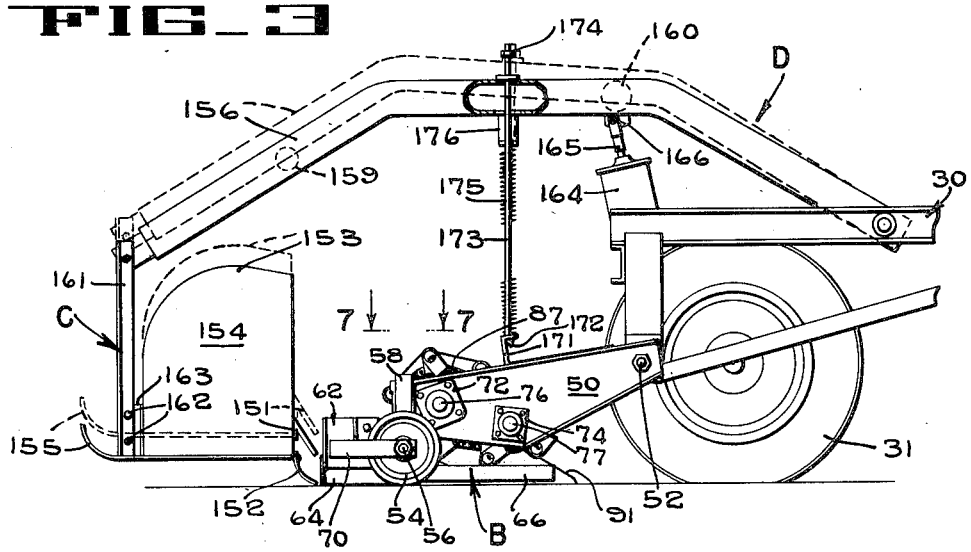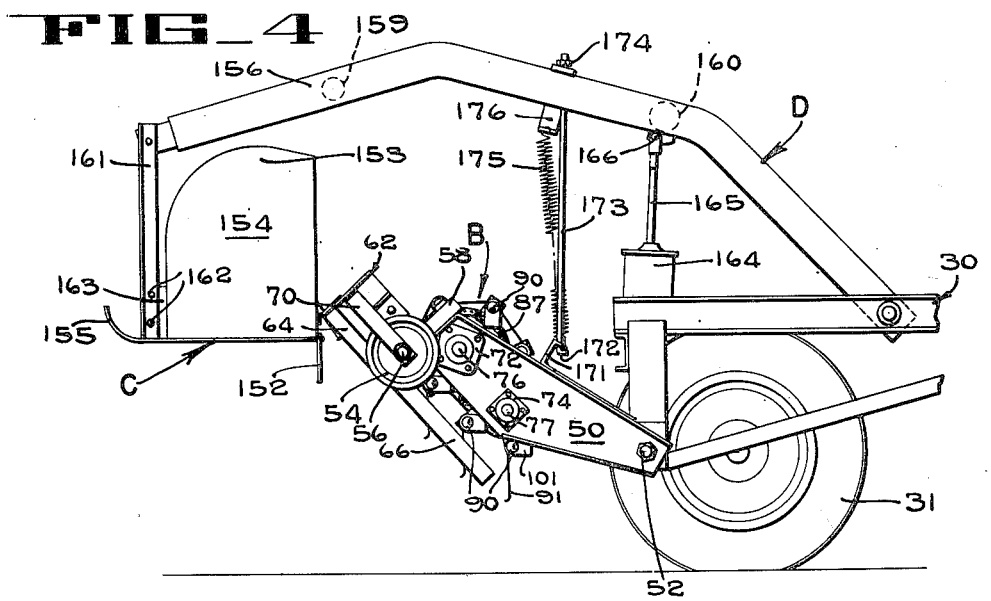

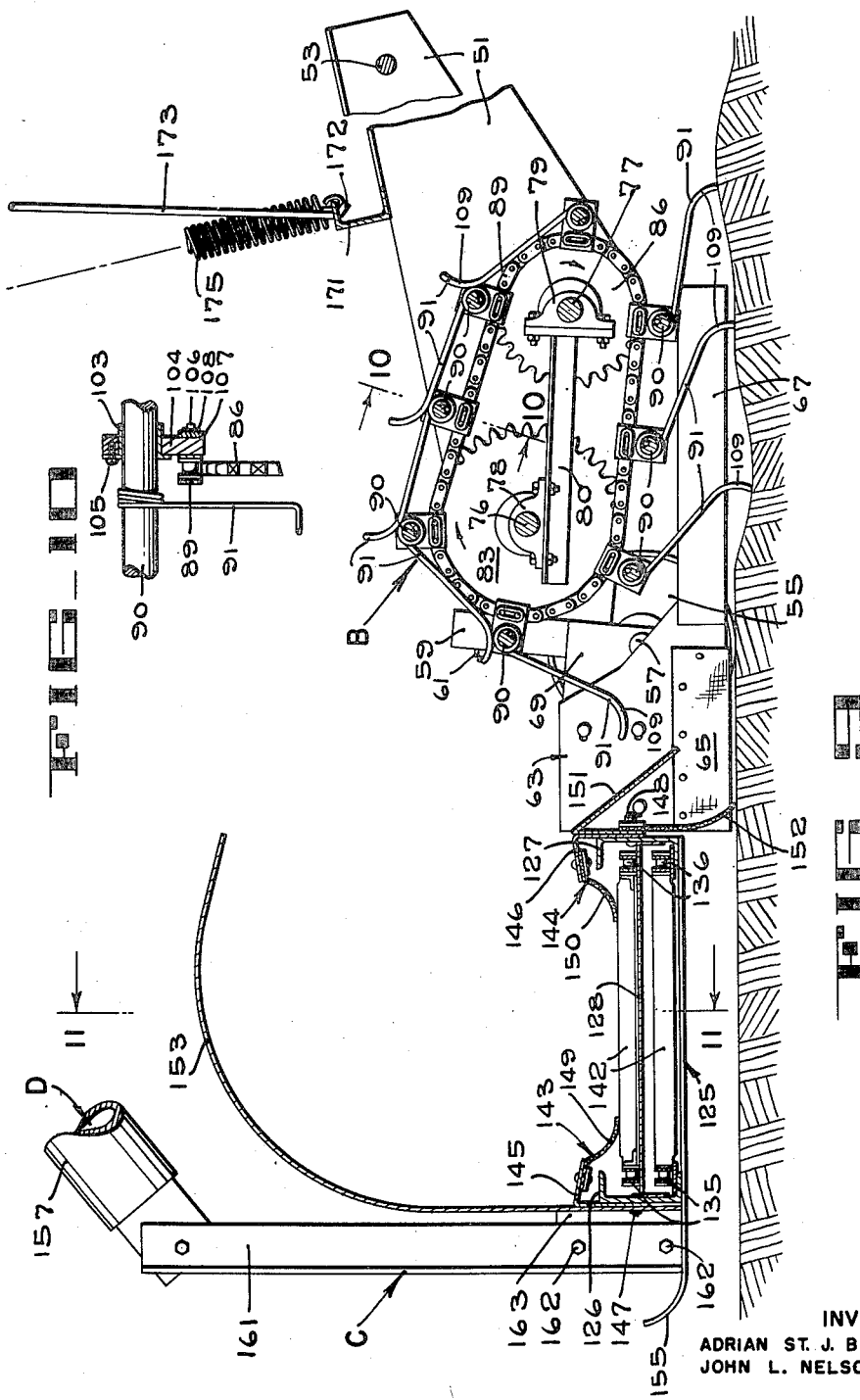

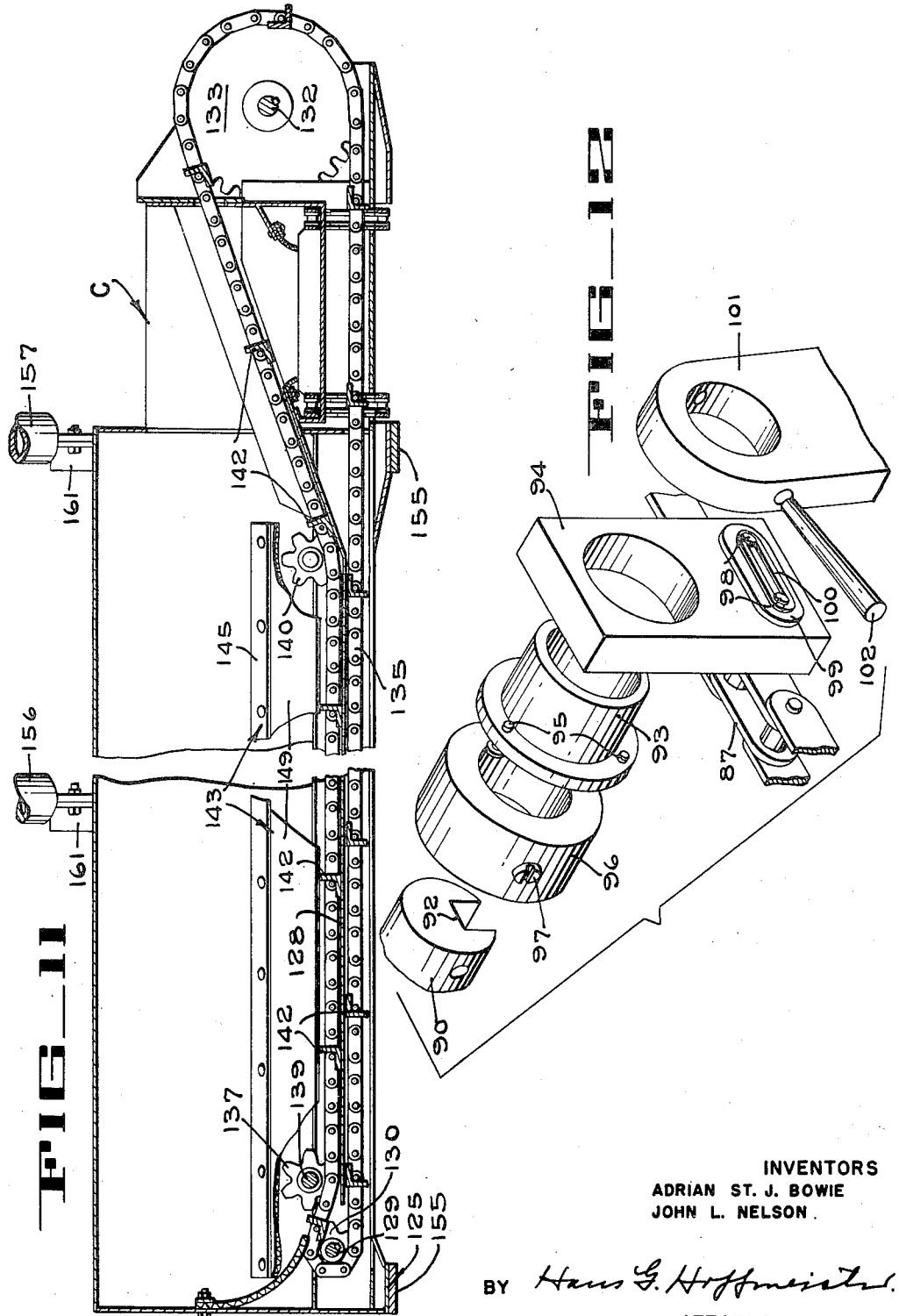

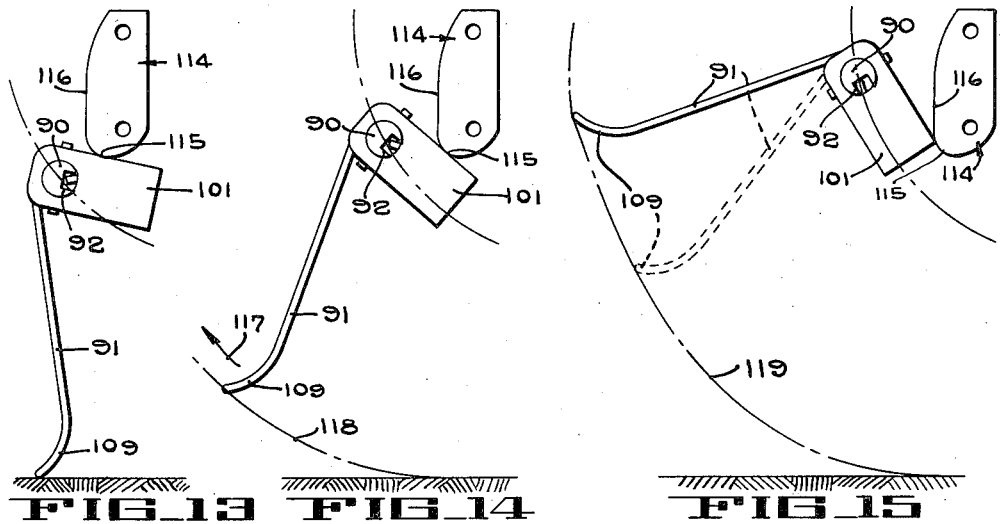
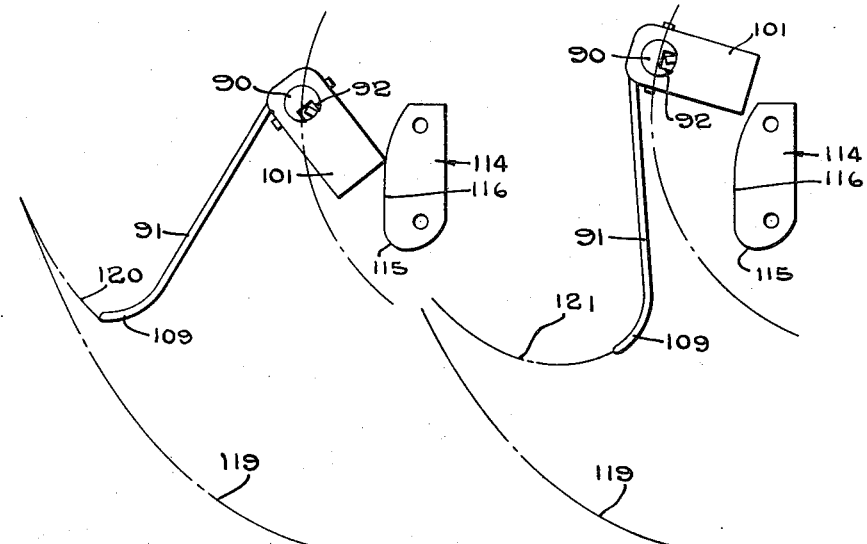
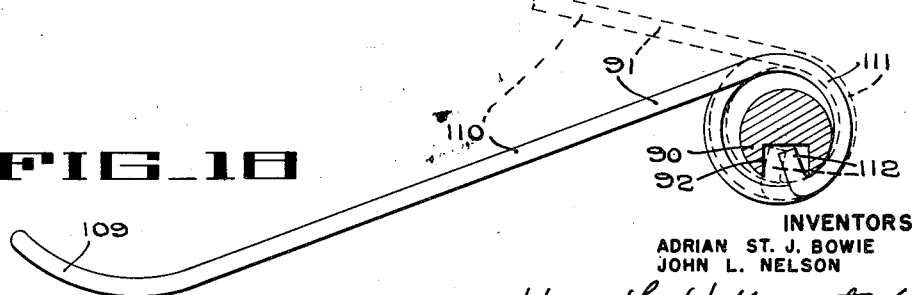

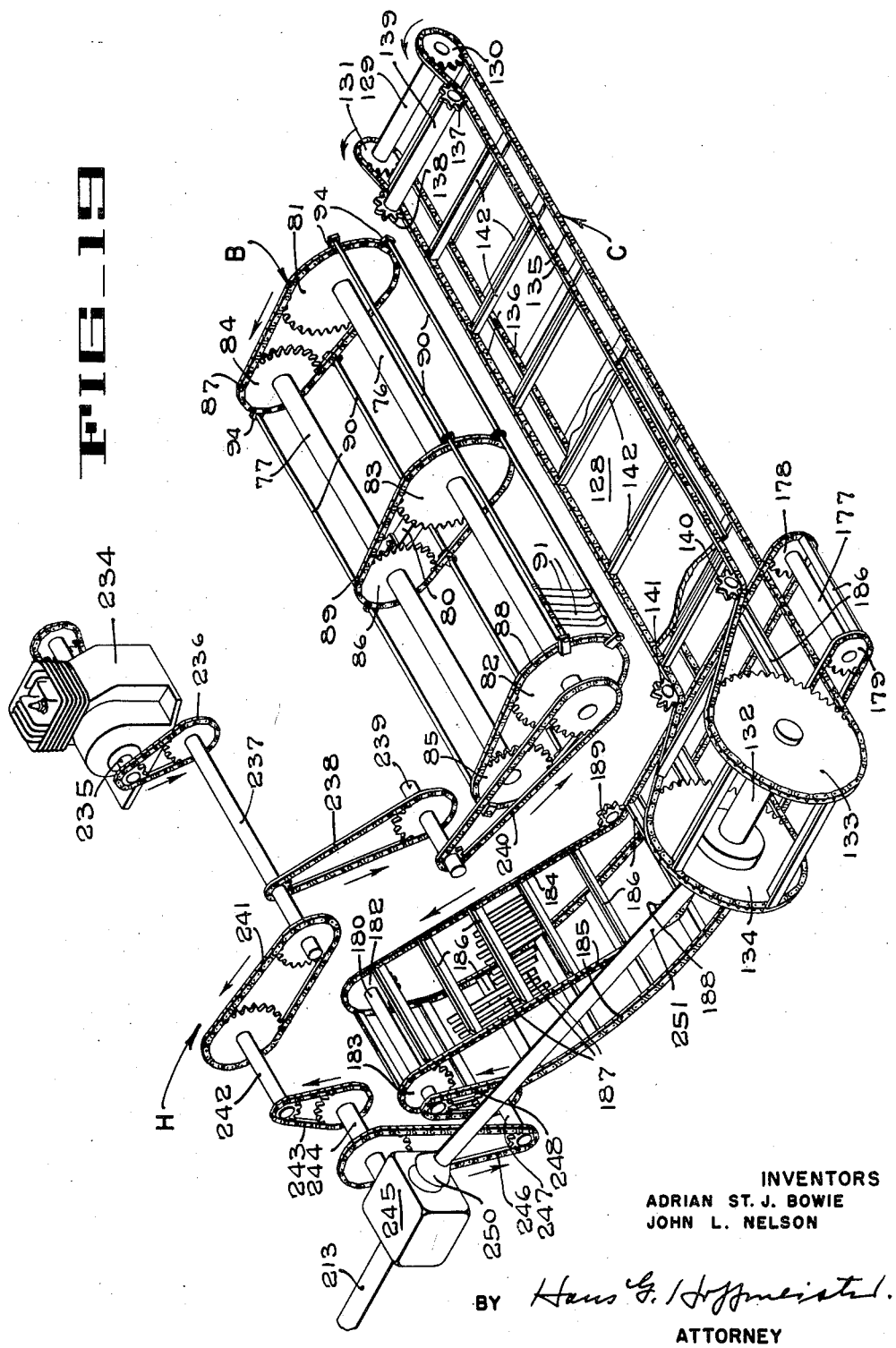

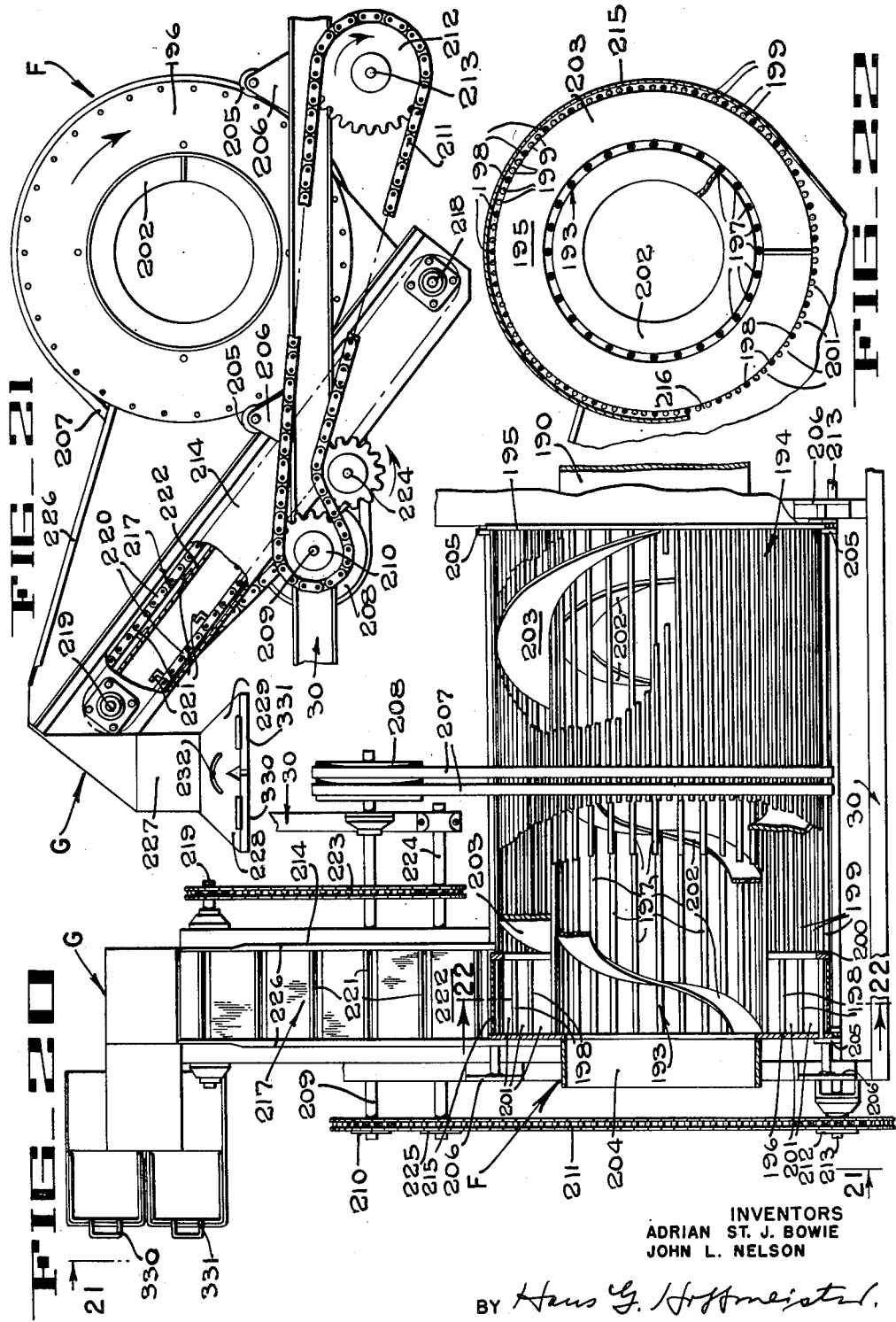

United States Patent Office 2,780,904
Patented Feb. 12, 1957

2,780,904
NUT PICKUP DEVICE

Adrian St. J. Bowie and John L. Nelson, San Jose, Calif., assignors to Food Machinery and Chemical Corporation, San Jose, Calif., a corporation of Delaware Application March 27, 1953, Serial No. 345,134

7 Claims. (Cl. 56—328)

This invention relates to improvements in nut harvesters, and more particularly to a nut harvester for gathering or picking up nuts or other similar fruit from the ground.

One object of the present invention is to provide a nut harvester having a novel and improved nut gathering or pick-up mechanism.

Another object is to provide a nut gathering mechanism for a nut harvester which is gentle in action to avoid damage or injury to the nuts gathered thereby.

Another object is to provide a nut gathering mechanism for a nut harvester which is self-conforming to terrain contours and which will closely follow any unevenness in the ground to assure maximum harvester efficiency and optimum nut recovery.

A further object is to provide a nut gathering mechanism for a nut harvester which may be gauged and maintained at a uniform distance relative to the ground to assure proper operation of the same regardless of variation in ground contour.

Another object is to provide a nut gathering mechanism for a nut harvester which may be rapidly elevated to inoperative position to permit transportation of the nut harvester from one location to another.

A further object is to provide a nut gathering mechanism for a nut harvester which will not dig into the ground and will pick up only a minimum of loose clods and rocks.

Another object is to provide a harvester which in addition to harvesting nuts, such as almonds, walnuts and the like, is also adapted to harvest fruit, such as prunes, apples for use in making cider, or any other fruit which may be gathered or picked up from the ground and processed for use.

Another object is to provide a self-propelled nut harvester having dual engines one for operating the nut gathering mechanism of the harvester at a predetermined set speed and the other to propel the harvester at varying ground speeds to accommodate and suit harvesting conditions.

A further object is to provide a self-propelled harvester having a very short turning radius rendering the harvester extremely maneuverable in restricted spaces and under various orchard conditions.

Another object is to provide a nut harvester having a novel and improved crop cleaning and screening mechanism for removing foreign matter from the harvested crop as it passes through debris, such as leaves, small twigs and the like, as well as clods or rocks of sizes larger or smaller than the specific crop being harvested.

These and other objects and advantages of the invention will become apparent from the following description and accompanying drawings in which:

Fig. 1 is a perspective view of a nut harvester embodying the novel nut gathering and crop cleaning mechanisms of the present invention;

Fig. 2 is a fragmentary plan view of the same;

Fig. 3 is a fragmentary side elevation, with parts broken away and parts shown in section, of the forward end of the nut harvester with the nut gathering and nut conveying mechanisms of same shown in harvesting positon;

Fig. 4 is a similar view with the nut gathering and nut conveying mechanisms shown in elevated position, as they would appear while the nut harvester is in transit;

Fig. 5 is an enlarged vertical longitudinal section taken along line 5—5 of Fig. 2;

Fig. 6 is an enlarged fragmentary vertical transverse section taken along line 6—6 of Fig. 2;

Fig. 7 is an enlarged fragmentary plan view taken in the direction of the arrows 7—7 of Fig. 3, with a nut gathering unit shown in engagement with the return kicker block thereof;

Fig. 8 is an enlarged view in perspective of a nut pick-up finger;

Fig. 9 is an enlarged fragmentary vertical longitudinal section taken along line 9—9 of Fig. 2;

Fig. 10 is an enlarged fragmentary vertical section taken along line 10—10 of Fig. 9;

Fig. 11 is an enlarged fragmentary vertical transverse section taken along line 11—11 of Fig. 9, with certain parts omitted for clarity of illustration;

Fig. 12 is an enlarged exploded perspective view of the mounting for a pick-up finger shaft;

Figs. 13 to 17, inclusive, are schematic views illustrating the various positions assumed by a row of nut pick-up fingers during a nut flipping operation;

Fig. 18 is an enlarged side elevation of a nut pick-up finger, illustrating the same in relation to its supporting shaft in a fully retracted position in full lines and in a fully advanced position in dotted lines;

Fig. 19 is a schematic perspective view of the drives for the several mechanisms of the nut harvester;

Fig. 20 is an enlarged top plan view of the crop screening mechanism of the nut harvester, certain parts being broken away and shown in section for clarity of illustration;

Fig. 21 is an end elevation of Fig. 20 taken in the direction of arrows 21—21 thereof;

Fig. 22 is a transverse vertical section taken along line 22—22 of Fig. 20.

The harvester of the present invention in general comprises a self-propelled vehicle A, a nut gathering mechanism B, a nut conveying mechanism C adapted to receive the crop from said gathering mechanism, a hoisting mechanism D for raising and lowering said gathering and conveying mechanisms, a nut elevating mechanism E, a nut cleaning and screening mechanism F, a nut discharging mechanism G and a common drive H for all of the aforesaid mechanisms.

The self-propelled vehicle A (Figs. 1 and 2) includes a vehicle frame 30 supported in a conventional manner upon front driving wheels 31 and 32 of the dual type and upon cambered rear steering wheels 33 and 34. Operably mounted upon the vehicle frame 30 at the left-hand side and rear end of same is a vehicle propelling engine 35 having a crank shaft 36. The crank shaft 36 is connected by a sprocket drive 37 to a differential mechanism 38, which in turn is connected by sprocket drives 39 and 40 to the front driving wheels 31 and 32, respectively. The rear steering wheels 33 and 34 of the vehicle A are interconnected in the usual manner by a drag link 41, which in turn is connected in any well-known manner to a vehicle steering wheel 42 preferably located at the left-hand side of the vehicle frame 30 and somewhat forwardly of the engine 35. Interposed between the engine 35 and the steering wheel 42 is a seat 43 for the operator of the harvester. Located adjacent the seat 43 are all of the manual controls for effecting the operation of the harvester, as will hereinafter be made more apparent.

The nut gathering mechanism B (Figs. 1 to 5, 9 and 18) is operatively mounted upon the front end of the vehicle frame 30 in parallel and substantially coextensive relation thereto and also in a manner to extend forwardly and normally in a downwardly inclined direction therefrom.

The nut gathering mechanism B is supported from the vehicle frame 30 by a pair of swing frame members 50 and 51, respectively, which are pivotally connected adjacent their rear ends, as by hinge bolts 52 and 53, to the sides of the vehicle frame 30 at the front end thereof. By individually mounting the swing frame members 50 and 51 upon the vehicle frame 30 in the manner just described, independent up and down movement of said swing frame members relative to each other is positively assured, which independent movement is a highly desirable and important feature of the present nut gathering mechanism, as will hereinafter be more fully described.

The swing frame members 50 and 51 at their forward ends are adjustably supported from the ground by gauge or depth wheels 54 and 55, respectively, having a relatively wide trend in proportion to their diameter. The gauge wheels 54 and 55 are rotatably mounted upon shouldered spindles 56 and 57, respectively, which extend laterally from the lower end portions of generally vertical slide members 58 and 59, respectively, with their inner end portions rigidly secured within the lower end portions of said slide members. The slide members 58 and 59 are mounted for vertical adjustment upon the front ends of their respective swing frame members 50 and 51, and for this purpose are vertically slotted in a fore and aft direction to receive pairs of bolts 60 and 61, respectively, carried by and extending perpendicularly in spaced relation from the front ends of their respective swing frame members 50 and 51. The bolts 60 and 61 serve to secure their respective slide members 58 and 59 in selected adjusted positions upon and relative to the front ends of their respective swing frame members 50 and 51 for a reason which will hereinafter be made more fully apparent.

Mounted forwardly of the gauge wheels 50 and 51 in outwardly divergent relation are wheel guards 62 and 63, respectively, which serve to direct any nuts normally lying in the paths of said gauge wheels by deflecting said nuts inwardly toward the nut gathering mechanism B, thereby preventing the crushing and destruction of such nuts by said gauge wheels. The forward outwardly divergent portions of the wheel guards 62 and 63 are preferably undercut and fixed to said wheel guards in substantially coextensive relation to the undercut portions thereof are dependent nut harvesting aprons 64 and 65, respectively, of flexible materials, such as leather, rubber, or the like, which serve to gently contact and deflect the nuts in the paths of the gauge wheels 54 and 55 toward and into the nut gathering mechanism B. Rigidly secured to the inner end portions of the wheel guards 62 and 63 are rearwardly extending baffle members 66 and 67, respectively, which effectively prevent sidewise dispersal of the nuts from the harvester. The wheel guards 62 and 63, adjacent their inner ends, are mounted for vertical and horizontal adjustment upon the angularly bent outer end portions of forwardly extending tongues 68 and 69, respectively, which have their inner end portions rigidly secured (Fig. 6) to the outer faces of their respective slide members 58 and 59. The wheel guards 62 and 63, adjacent their outer ends are mounted for horizontal adjustment upon the angularly bent outer end portions of forwardly extending guard braces 70 and 71, respectively, which braces are detachably secured at their inner ends upon the outer threaded ends of the spindles 56 and 57, respectively, by the wheel retention nuts thereof.

Detachably secured in axially aligned relation upon the forward end portions of the swing frame members 50 and 51 are bearings 72 and 73, respectively. Similarly secured in axially aligned relation upon the swing frame members 50 and 51, at points thereon rearwardly and slightly below the level of the bearings 72 and 73 are bearings 74 and 75, respectively. Rotatably mounted, adjacent its ends, within the bearings 72 and 73 is a drive shaft 76 for the nut gathering mechanism B. Similarly mounted, adjacent its ends, within the bearings 74 and 75 is an idler shaft 77 for said nut gathering mechanism. The drive and idler shafts 76 and 77 are also rotatably mounted, at points substantially midway their lengths, within bearings 78 and 79, respectively. These bearings are detachably secured to a longitudinally disposed T-shaped tie member 80, which serves to brace the shafts 76 and 77 and maintain the same in proper spaced parallel relation. Fixedly secured to the drive shaft 76, adjacent the bearings 72 and 73 thereof, are sprocket wheels 81 and 82, respectively, and similarly secured to said drive shaft 76, adjacent the bearing 78 thereof, is a sprocket wheel 83. Fixed to the idler shaft 77, adjacent the bearings 74 and 75 thereof, are sprocket wheels 84 and 85, respectively, and similarly secured to said idler shaft, adjacent the bearing 79 thereof, is a sprocket wheel 86. Trained around the sprocket wheels 81, 84 and 82, 85 are endless sprocket chains 87 and 88, respectively, and trained around the sprocket wheels 83 and 86 is an endless sprocket chain 89.

Operably mounted at uniformly spaced intervals upon the endless sprocket chains 87, 88 and 89 for movement therewith in a cyclic path of travel are a plurality of transversely disposed shafts 90, each of which carry a row of individually mounted resilient U-shaped nut pickup fingers or tines 91. The individual fingers 91 are mounted upon their shaft 90 for limited rotative movement thereon independently of each other for a reason which will shortly be made more apparent. As the shafts 90 with their rows of resilient U-shaped nut pick-up fingers 91 are identical in construction a description of one such shaft and its correlated instrumentalities will suffice for all.

The shaft 90 is provided in the periphery thereof with a longitudinally disposed groove 92, for a purpose shortly to be described, which groove extends from end to end of said shaft, as shown in Fig. 12. The shaft 90 at the left-hand end thereof, i. e., the end having the sprocket wheel 81, is rotatably mounted within and extends through a flanged bearing sleeve 93. This sleeve 93 normally seats within and extends through the suitably apertured upper end of a bearing block 94 and is fixed to the latter by screws 95. A set collar 96 is mounted upon the shaft 90 inwardly of the sleeve 93 for abutment with the heads of the screws 95 thereof and is fixed to the shaft 90 by a set screw 97, to thus retain said shaft against axial movement within said sleeve 93. The bearing block 94 is detachably secured at its lower end to the outer side of the endless sprocket chain 87 to extend outwardly therefrom in substantially perpendicular relation thereto. Accordingly, the chain 87 is provided with a pair of extra long link pins 98, which are received by and extend through the suitably apertured lower end portion of the bearing block 94. To retain the bearing block 94 upon the pins 98 a chain side plate 99 is provided, which in turn is retained upon said pins 98 by an endless keeper member 100 trained around the pins 98 with the looped ends thereof normally seating within the outer terminal portions of said pins 98, which portions are annularly grooved for such purpose. The above described left-hand end of the shaft 90 projects sufficiently from the flanged sleeve 93 to receive a kicker arm 101, which arm is fixed to said shaft 90 by a tapered pin 102, and when so secured said kicker arm normally abuts the outer end of said sleeve 93. The shaft 90 at the right-hand end thereof, i. e., the end having the sprocket wheel 82, is rotatably mounted upon the endless sprocket chain 88, in the identical manner hereinabove described for the rotatable mounting of the left-hand end of said shaft, upon the endless sprocket chain 87, with the one exception that the kicker arm 101 is omitted at the right-hand end thereof. The shaft 90 is also rotatably mounted, substantially midway the length thereof (Figs. 9 and 10) upon the endless sprocket chain 89. In its central rotatable mounting the shaft 90 extends through a flanged bearing sleeve 103, which normally seats within the suitably apertured upper end of a bearing block 104 and is fixed therein by screws 105. The bearing block 104 is detachably secured at its lower end to the left-hand side of the endless sprocket chain 89 to extend outwardly therefrom in perpendicular relation thereto. For this purpose the chain 89 is provided with a pair of extra long link pins 106, which are received by and extend through the suitably apertured lower end portion of the bearing block 104, which is retained on said link pins by a chain side plate 107, and which in turn is retained upon the link pins 106 by an endless keeper member 108 trained around said link pins with the looped ends thereof normally seating within annularly grooved terminal portions of said link pins.

As hereinbefore stated a row of resilient U-shaped nut pick-up fingers or tines 91 are individually mounted upon their correlated shaft 90 for limited rotative movement thereon independently of each other. These fingers 91 are also mounted upon their shaft 90 in juxtaposed relation and are preferably fabricated from resilient material, such as spring steel. Since all of the fingers 91 are identical in construction a description of one finger will suffice for all. The finger 91 is bent in the U-shaped formation shown more clearly in Fig. 8, and with the outer or nut pick-up end 109 bent or curved forwardly in the direction of the nut gathering movement of said finger. To provide a mounting for the finger 91 upon the shaft 90, the inner end portions of the legs 110 of said finger are helically wound to form coils 111, which are adapted to fit loosely upon the shaft 90. The terminal portions 112 (Figs. 8 and 18) of the coils 111 are bent inwardly in substantially radial relation to the axis of the shaft 90 to normally seat within the longitudinally disposed groove 92 thereof. To secure limited rotative movement of the finger 91 upon its supporting shaft 90, the width of the shaft groove 92 is slightly more than twice the diameter of the terminals 112, as more clearly shown in Fig. 18.

By rotatably mounting the nut pick-up finger supporting shafts 90 upon the endless sprocket chains 87, 88 and 89 in the manner herein shown and described, these shafts move or travel with said chains about a locus of points, so that the rows of nut pick-up fingers or tines carried by the shafts 90 currently moving with the lower reaches of said chains are in contact with the ground (Figs. 3, 5 and 9), in other words, a plurality of successive rows of nut pick-up fingers are in contact with the ground at all times. Moreover, the manner of individually mounting the nut pick-up fingers 91 upon their respective supporting shafts 90 for limited rotative movement relative thereto, permits the fingers upon each of said shafts to raise and lower independently of each other according to ground contour. This type of finger mounting also serves to gravitationally maintain the fingers 91 in contact with the ground, and thus in effect provide a floating contact for said fingers with the ground. Stated otherwise, the fingers 91 individually rise upon contact with any elevation of the ground and conversely drop individually into any depression in the ground. In connection with the foregoing, it should be here pointed out that the grooves 92 in the shafts 90 permit of the floating action of the individual nut pick-up fingers 91, and that the amount of play of the finger terminals 112 within said grooves 92 is ample and sufficient to compensate for the average or normal elevations or depressions generally found in orchard terrain.

It will be noted by referring more particularly to Fig. 5, that during the cyclic movement of the finger supporting shafts 90 within their closed or orbital path of travel, said shafts 90 with their fixed kicker arms 101 assume various rotated positions during a cyclic movement of the same. The rows of nut pick-up fingers 91 mounted upon the shafts 90 also assume various positions with and also relative to said shafts during said cyclic movement. The shafts 90 are caused to successively assume the various rotated positions of same illustrated in Fig. 5, either by torque exerted thereon by their respective rows of nut pick-up fingers 91, or by their respective kicker arms 101. It should be here borne in mind that the row of nut pick-up fingers 91 on each shaft 90 is considerably heavier than the kicker arm 101 of said shaft, hence greater torque is exerted by said row of fingers upon said shaft than by said kicker arm at certain portions of the cyclic movement of said shaft to rotate the same about its axis, while at other portions of said cyclic movement, specifically when the row of nut pick-up fingers 91 are retracted and are at rest, torque is exerted by the kicker arm 101 upon the shaft 90 to rotate the same about its axis.

To further amplify the foregoing, reference should be had to Fig. 5, wherein the shaft 90 shown at the upper left-hand end of said view is currently upon the ascending portion of its cyclic path of travel and has its row of nut pick-up fingers 91 depending therefrom. At this point of its travel the shaft 90 is positively held against clockwise rotative movement by the finger terminals 112 seated within the groove 92 thereof by reason of any torque exerted thereon by its kicker arm 101 tending to rotate the shaft 90 in a clockwise direction. The rows of nut pick-up fingers 91 of the shafts 90 currently upon the upper reach of their cyclic path of travel are normally retracted and are in a position of rest, as shown in Figs. 5 and 9, consequently do not exert any torque upon their respective shafts. However, at such place and time the kicker arms 101 do exert torque upon their respective shafts 90 to rotate the latter to positions in which their kicker arms 101 depend downwardly as shown. As each shaft 90 moves from said upper reach onto the descending portion of its cyclic path of travel centrifugal force and gravity jointly function to throw its row of nut pick-up fingers 91 outwardly and downwardly into contact with the ground, and in so doing such shaft and its associated arm 101 is rotated to the position shown for the shafts 90 currently upon their lower reach of their cyclic path of travel, at which time the rows of nut pick-up fingers of said shafts have free floating movement upon the ground. Thus far in the present description, it has been indicated that rotative movement has only been imparted to each shaft 90 by torque exerted thereon, by either its row of nut pick-up fingers 91, or by its kicker arm 101. However, in addition to the foregoing, a rotative impulse is also imparted to each shaft 90 at a predetermined point in its cyclic path of travel from another source, as and in a manner and for a purpose now to be described.

Fixed by bolts 113 (Fig. 5) to the inner side of the swing frame member 50 and adjacent the forward end thereof is an impulse imparting cam 114, which cam is disposed to lie in the cyclic path of travel of the kicker arms 101 and to be successively engaged by said arms, to thus impart a rotative impulse to their respective shafts 90 and, in turn, a flipping movement to the respective rows of nut pick-up fingers 91 on said shafts. For this purpose the impulse imparting cam 114 is provided at its lower end with an arm contacting, arcuate nose portion 115 and also with an arm contacting, generally vertical, rectilinear face 116 upon the forward edge thereof.

It will be noted by referring to Fig. 5 that the shafts 90 currently on the forwardly and slightly upwardly inclined lower reach of their cyclic path of travel have their respective rows of nut pick-up fingers 91 in nut gathering ground contact, and also have their respective kicker arms 101 inclined upwardly and rearwardly at an angle of approximately forty-five degrees. Consequently, as each of the shafts 90 passes the cam 114 the upper side of the kicker arm 101 thereof contacts the arcuate nose portion 115 of said cam 114 and is abruptly depressed thereby to thus impart a rotative impulse to its shaft 90 and in turn a nut flipping movement to the row of nut pick-up fingers 91 mounted upon the shaft 90. However, it is important here to note that contact of a kicker arm 101 with the nose 115 of the cam 114 and the resultant flipping movement of the row of nut pick-up fingers 91 associated therewith does not occur until said row of fingers has reached a substantially vertical position, as shown at the left-hand end of Fig. 5 and also again in Fig. 13. The row of nut pick-up fingers 91 reaches its substantially vertical position after the shaft 90 thereof has entered and moved upwardly on the ascending leg of its cyclic path, and the specific reason for thus vertically positioning said row of fingers prior to imparting a nut flipping movement thereto is to effectually prevent the curved outer ends 109 of said fingers digging clods from the ground and having such clods become mixed with the crop being harvested.

As pointed out heretofore, when a kicker arm 101 contacts the cam 114 a rotative impulse is imparted to its shaft 90 and in turn a nut flipping movement is imparted to the row of nut pick-up fingers 91 mounted upon said shaft. The nut flipping movement of the row of fingers 91 is initiated from the substantially vertical position of the same shown in Figs. 5 and 13, and such movement terminates with said row of fingers disposed in the forwardly extending and substantially horizontal position of same shown in full lines in Fig. 15, at which time the kicker arm 101 of said row of fingers 91 has moved off the nose portion 115 of the cam 114. It should be here understood that the movement of the row of fingers 91 from its vertical position shown in Figs. 5 and 13 to its generally horizontal position shown in full lines in Fig. 15 is to all intents and purposes instantaneous. During the instantaneous nut flipping movement of the row of fingers 91, the associated kicker arm 101 of the same remains in contact with the nose portion of the cam 114, as and in the manner shown in Fig. 14.

The position of the row of fingers 91 shown in Fig. 14 is approximately the nut discharge position of said row of fingers and the arrow 117 therein indicates the approximate trajectory of the nuts as they leave said row of fingers 91. Also in Fig. 14 the path of travel of the outer curved ends 109 of the row of fingers 91 from the ground to the approximate nut discharge position of said row of fingers is indicated by a dot and dash curved line 118.

In Fig. 15 the path of travel of the curved outer ends 109 of the row of fingers 91 from the ground to the maximum normal position assumed by same, as and when the associated kicker arm 101 thereof leaves the nose portion 115 of the cam 114, is indicated by a dot and dash curved line 119, which line is actually an extension of the dot and dash curved line 118 of Fig. 14. In certain instances the row of fingers 91 do not reach their maximum normal position, but stop short of same substantially in the position shown in dotted lines in Fig. 15, due principally to overloading of said row of fingers by leaves and twigs collecting thereon.

In Fig. 16 the row of nut pick-up fingers 91 is shown after it has completed a nut flipping movement, at which time the kicker arm 101 associated therewith has moved upwardly upon the rectilinear face 116 of the cam 114. It is important here to note that the rectilinear face 116 on the cam 114 prevents premature return of the aforementioned row of nut pick-up fingers 91 after the same have been flipped to thus avoid interference by said row of fingers with the flipping movement of the succeeding row of nut pick-up fingers. Also in Fig. 16 the row of nut pick-up fingers 91 are shown in a position assumed by such row after it has dropped back from its maximum normal position shown in full lines in Fig. 15. A dot and dash curved line 120, shown in Fig. 16 as diverging downwardly from the upper end of the dot and dash curved line 119, indicates the path of travel of the outer curved ends 109 of the nut pick-up fingers 91 as the row of same drops back, as above described. The dropping back of the row of nut pick-up fingers 91 just described is due to the rotation of said row of fingers upon its shaft 90, which latter at such time is held against rotation by the engagement of its kicker arm 101 with the rectilinear face 116 of the cam 114.

In Fig. 17 the kicker arm 101 of the row of nut pick-up fingers 91 now being described is shown as having just left the rectilinear face 116 of the cam 114, at which time said row of nut pick-up fingers immediately drop to the generally vertical position shown. In thus dropping to such a vertical position the row of nut pick-up fingers 91 rotates its shaft 90 and associated kicker arm 101 to the position indicated, and the outer curved ends 109 of said fingers 91 describe the path indicated by a dot and dash curved line 121, which latter is an extension of the dot and dash curved line 120 of Fig. 16.

In Fig. 18 and for a better understanding of the operation of the nut gathering mechanism B, a nut pick-up finger 91 of said mechanism is shown upon its shaft 90 in a fully retracted position in full lines and is also shown as rotated upon said shaft to a fully advanced position in dotted lines. The fully retracted position of the finger 91 shown in full lines may be either a nut gathering position of such finger while the same is clearing a ground obstruction, or may be the position assumed by said finger at the start of a nut flipping movement of same. The fully advanced position of the finger 91 shown in dotted lines may be either a nut gathering position of such finger when the same drops into a ground depression, or may be the position assumed by said finger after completion of a nut flipping movement of the same.

As frequently occurs during the operation of the nut gathering mechanism B, a row of nut pick-up fingers 91 may be thrown by centrifugal force beyond the normal maximum position thereof, shown in full lines in Fig. 15, to substantially a dotted line position of a row of such fingers shown at the upper left-hand end of Fig. 5. When such row of fingers 91 are thus thrown the associated kicker arm 101 thereof extends forwardly in a substantially horizontal manner and engages a stationary, inwardly extending lateral arm 122 (Figs. 5 and 7) of a return kicker block 123. Upon engagement of such kicker arm 101 with the lateral arm 122, and with the upward movement of the shaft 90 of said kicker arm 101 on the ascending leg of its cyclic path, said shaft is caused to rotate in a counterclockwise direction, as viewed in Fig. 5; and in consequence the row of fingers 91 on said shaft are returned to a normal dependent position. The return kicker block 123 is rigidly secured to the swing frame member 50 by the bolts 60. The lateral arm 122 of the return kicker block 123 is located relative to the cam 114 in such a manner to positively prevent interference by said lateral arm with the flipping movement of the row of nut pick-up fingers 91 then in current engagement with the cam 114. Therefore, contact of the lateral arm 122 by the kicker arm 101 of the above mentioned row of nut pick-up fingers 91 is only effected subsequent to the completion of the flipping movement of such row of fingers. Moreover, the location of the lateral arm 122 of the return kicker block 123 relative to the cam 114 is such that no interference occurs between the row of nut pick-up fingers 91 being returned thereby to a normal position, as hereinbefore described, and the succeeding row of nut pick-up fingers 91 currently undergoing a nut flipping movement.

At this time reference is again had to the depth or gauge wheels 54 and 55, and it is important here to note that such wheels serve to accurately gauge the nut gathering mechanism B regardless of ground contour. Hence, it is highly desirable that these wheels be located both horizontally and vertically in relation to the nut gathering instrumentalities of the nut gathering mechanism B tion that the kicker arm 101 is omitted at the right-hand end thereof. The shaft 90 is also rotatably mounted, substantially midway the length thereof (Figs. 9 and 10) upon the endless sprocket chain 89. In its central rotatable mounting the shaft 90 extends through a flanged bearing sleeve 103, which normally seats within the suitably apertured upper end of a bearing block 104 and is fixed therein by screws 105. The bearing block 104 is detachably secured at its lower end to the left-hand side of the endless sprocket chain 89 to extend outwardly therefrom in perpendicular relation thereto. For this purpose the chain 89 is provided with a pair of extra long link pins 106, which are received by and extend through the suitably apertured lower end portion of the bearing block 104, which is retained on said link pins by a chain side plate 107, and which in turn is retained upon the link pins 106 by an endless keeper member 108 trained around said link pins with the looped ends thereof normally seating within annularly grooved terminal portions of said link pins.

As hereinbefore stated a row of resilient U-shaped nut pick-up fingers or tines 91 are individually mounted upon their correlated shaft 90 for limited rotative movement thereon independently of each other. These fingers 91 are also mounted upon their shaft 90 in juxtaposed relation and are preferably fabricated from resilient material, such as spring steel. Since all of the fingers 91 are identical in construction a description of one finger will suffice for all. The finger 91 is bent in the U-shaped formation shown more clearly in Fig. 8, and with the outer or nut pick-up end 109 bent or curved forwardly in the direction of the nut gathering movement of said finger. To provide a mounting for the finger 91 upon the shaft 90, the inner end portions of the legs 110 of said finger are helically wound to form coils 111, which are adapted to fit loosely upon the shaft 90. The terminal portions 112 (Figs. 8 and 18) of the coils 111 are bent inwardly in substantially radial relation to the axis of the shaft 90 to normally seat within the longitudinally disposed groove 92 thereof. To secure limited rotative movement of the finger 91 upon its supporting shaft 90, the width of the shaft groove 92 is slightly more than twice the diameter of the terminals 112, as more clearly shown in Fig. 18.

By rotatably mounting the nut pick-up finger supporting shafts 90 upon the endless sprocket chains 87, 88 and 89 in the manner herein shown and described, these shafts move or travel with said chains about a locus of points, so that the rows of nut pick-up fingers or tines carried by the shafts 90 currently moving with the lower reaches of said chains are in contact with the ground (Figs. 3, 5 and 9), in other words, a plurality of successive rows of nut pick-up fingers are in contact with the ground at all times. Moreover, the manner of individually mounting the nut pick-up fingers 91 upon their respective supporting shafts 90 for limited rotative movement relative thereto, permits the fingers upon each of said shafts to raise and lower independently of each other according to ground contour. This type of finger mounting also serves to gravitationally maintain the fingers 91 in contact with the ground, and thus in effect provide a floating contact for said fingers with the ground. Stated otherwise, the fingers 91 individually rise upon contact with any elevation of the ground and conversely drop individually into any depression in the ground. In connection with the foregoing, it should be here pointed out that the grooves 92 in the shafts 90 permit of the floating action of the individual nut pick-up fingers 91, and that the amount of play of the finger terminals 112 within said grooves 92 is ample and sufficient to compensate for the average or normal elevations or depressions generally found in orchard terrain.

It will be noted by referring more particularly to Fig. 5, that during the cyclic movement of the finger supporting shafts 90 within their closed or orbital path of travel, said shafts 90 with their fixed kicker arms 101 assume various rotated positions during a cyclic movement of the same. The rows of nut pick-up fingers 91 mounted upon the shafts 90 also assume various positions with and also relative to said shafts during said cyclic movement. The shafts 90 are caused to successively assume the various rotated positions of same illustrated in Fig. 5, either by torque exerted thereon by their respective rows of nut pick-up fingers 91, or by their respective kicker arms 101. It should be here borne in mind that the row of nut pick-up fingers 91 on each shaft 90 is considerably heavier than the kicker arm 101 of said shaft, hence greater torque is exerted by said row of fingers upon said shaft than by said kicker arm at certain portions of the cyclic movement of said shaft to rotate the same about its axis, while at other portions of said cyclic movement, specifically when the row of nut pick-up fingers 91 are retracted and are at rest, torque is exerted by the kicker arm 101 upon the shaft 90 to rotate the same about its axis.

To further amplify the foregoing, reference should be had to Fig. 5, wherein the shaft 90 shown at the upper left-hand end of said view is currently upon the ascending portion of its cyclic path of travel and has its row of nut pick-up fingers 91 depending therefrom. At this point of its travel the shaft 90 is positively held against clockwise rotative movement by the finger terminals 112 seated within the groove 92 thereof by reason of any torque exerted thereon by its kicker arm 101 tending to rotate the shaft 90 in a clockwise direction. The rows of nut pick-up fingers 91 of the shafts 90 currently upon the upper reach of their cyclic path of travel are normally retracted and are in a position of rest, as shown in Figs. 5 and 9, consequently do not exert any torque upon their respective shafts. However, at such place and time the kicker arms 101 do exert torque upon their respective shafts 90 to rotate the latter to positions in which their kicker arms 101 depend downwardly as shown. As each shaft 90 moves from said upper reach onto the descending portion of its cyclic path of travel centrifugal force and gravity jointly function to throw its row of nut pick-up fingers 91 outwardly and downwardly into contact with the ground, and in so doing such shaft and its associated arm 101 is rotated to the position shown for the shafts 90 currently upon their lower reach of their cyclic path of travel, at which time the rows of nut pick-up fingers of said shafts have free floating movement upon the ground. Thus far in the present description, it has been indicated that rotative movement has only been imparted to each shaft 90 by torque exerted thereon, by either its row of nut pick-up fingers 91, or by its kicker arm 101. However, in addition to the foregoing, a rotative impulse is also imparted to each shaft 90 at a predetermined point in its cyclic path of travel from another source, as and in a manner and for a purpose now to be described.

Fixed by bolts 113 (Fig. 5) to the inner side of the swing frame member 50 and adjacent the forward end thereof is an impulse imparting cam 114, which cam is disposed to lie in the cyclic path of travel of the kicker arms 101 and to be successively engaged by said arms, to thus impart a rotative impulse to their respective shafts 90 and, in turn, a flipping movement to the respective rows of nut pick-up fingers 91 on said shafts. For this purpose the impulse imparting cam 114 is provided at its lower end with an arm contacting, arcuate nose portion 115 and also with an arm contacting, generally vertical, rectilinear face 116 upon the forward edge thereof.

It will be noted by referring to Fig. 5 that the shafts 90 currently on the forwardly and slightly upwardly inclined lower reach of their cyclic path of travel have their respective rows of nut pick-up fingers 91 in nut gathering ground contact, and also have their respective kicker arms 101 inclined upwardly and rearwardly at an angle of approximately forty-five degrees. Consequently, as each of the shafts 90 passes the cam 114 the upper side of the kicker arm 101 thereof contacts the arcuate nose portion 115 of said cam 114 and is abruptly depressed thereby to thus impart a rotative impulse to its shaft 90 and in turn a nut flipping movement to the row of nut pick-up fingers 91 mounted upon the shaft 90. However, it is important here to note that contact of a kicker arm 101 with the nose 115 of the cam 114 and the resultant flipping movement of the row of nut pick-up fingers 91 associated therewith does not occur until said row of fingers has reached a substantially vertical position, as shown at the left-hand end of Fig. 5 and also again in Fig. 13. The row of nut pick-up fingers 91 reaches its substantially vertical position after the shaft 90 thereof has entered and moved upwardly on the ascending leg of its cyclic path, and the specific reason for thus vertically positioning said row of fingers prior to imparting a nut flipping movement thereto is to effectually prevent the curved outer ends 109 of said fingers digging clods from the ground and having such clods become mixed with the crop being harvested.

As pointed out heretofore, when a kicker arm 101 contacts the cam 114 a rotative impulse is imparted to its shaft 90 and in turn a nut flipping movement is imparted to the row of nut pick-up fingers 91 mounted upon said shaft. The nut flipping movement of the row of fingers 91 is initiated from the substantially vertical position of the same shown in Figs. 5 and 13, and such movement terminates with said row of fingers disposed in the forwardly extending and substantially horizontal position of same shown in full lines in Fig. 15, at which time the kicker arm 101 of said row of fingers 91 has moved off the nose portion 115 of the cam 114. It should be here understood that the movement of the row of fingers 91 from its vertical position shown in Figs. 5 and 13 to its generally horizontal position shown in full lines in Fig. 15 is to all intents and purposes instantaneous. During the instantaneous nut flipping movement of the row of fingers 91, the associated kicker arm 101 of the same remains in contact with the nose portion of the cam 114, as and in the manner shown in Fig. 14.

The position of the row of fingers 91 shown in Fig. 14 is approximately the nut discharge position of said row of fingers and the arrow 117 therein indicates the approximate trajectory of the nuts as they leave said row of fingers 91. Also in Fig. 14 the path of travel of the outer curved ends 109 of the row of fingers 91 from the ground to the approximate nut discharge position of said row of fingers is indicated by a dot and dash curved line 118.

In Fig. 15 the path of travel of the curved outer ends 109 of the row of fingers 91 from the ground to the maximum normal position assumed by same, as and when the associated kicker arm 101 thereof leaves the nose portion 115 of the cam 114, is indicated by a dot and dash curved line 119, which line is actually an extension of the dot and dash curved line 118 of Fig. 14. In certain instances the row of fingers 91 do not reach their maximum normal position, but stop short of same substantially in the position shown in dotted lines in Fig. 15, due principally to overloading of said row of fingers by leaves and twigs collecting thereon.

In Fig. 16 the row of nut pick-up fingers 91 is shown after it has completed a nut flipping movement, at which time the kicker arm 101 associated therewith has moved upwardly upon the rectilinear face 116 of the cam 114. It is important here to note that the rectilinear face 116 on the cam 114 prevents premature return of the aforementioned row of nut pick-up fingers 91 after the same have been flipped to thus avoid interference by said row of fingers with the flipping movement of the succeeding row of nut pick-up fingers. Also in Fig. 16 the row of nut pick-up fingers 91 are shown in a position assumed by such row after it has dropped back from its maximum normal position shown in full lines in Fig. 15. A dot and dash curved line 120, shown in Fig. 16 as diverging downwardly from the upper end of the dot and dash curved line 119, indicates the path of travel of the outer curved ends 109 of the nut pick-up fingers 91 as the row of same drops back, as above described. The dropping back of the row of nut pick-up fingers 91 just described is due to the rotation of said row of fingers upon its shaft 90, which latter at such time is held against rotation by the engagement of its kicker arm 101 with the rectilinear face 116 of the cam 114.

In Fig. 17 the kicker arm 101 of the row of nut pick-up fingers 91 now being described is shown as having just left the rectilinear face 116 of the cam 114, at which time said row of nut pick-up fingers immediately drop to the generally vertical position shown. In thus dropping to such a vertical position the row of nut pick-up fingers 91 rotates its shaft 90 and associated kicker arm 101 to the position indicated, and the outer curved ends 109 of said fingers 91 describe the path indicated by a dot and dash curved line 121, which latter is an extension of the dot and dash curved line 120 of Fig. 16.

In Fig. 18 and for a better understanding of the operation of the nut gathering mechanism B, a nut pick-up finger 91 of said mechanism is shown upon its shaft 90 in a fully retracted position in full lines and is also shown as rotated upon said shaft to a fully advanced position in dotted lines. The fully retracted position of the finger 91 shown in full lines may be either a nut gathering position of such finger while the same is clearing a ground obstruction, or may be the position assumed by said finger at the start of a nut flipping movement of same. The fully advanced position of the finger 91 shown in dotted lines may be either a nut gathering position of such finger when the same drops into a ground depression, or may be the position assumed by said finger after completion of a nut flipping movement of the same.

As frequently occurs during the operation of the nut gathering mechanism B, a row of nut pick-up fingers 91 may be thrown by centrifugal force beyond the normal maximum position thereof, shown in full lines in Fig. 15, to substantially a dotted line position of a row of such fingers shown at the upper left-hand end of Fig. 5. When such row of fingers 91 are thus thrown the associated kicker arm 101 thereof extends forwardly in a substantially horizontal manner and engages a stationary, inwardly extending lateral arm 122 (Figs. 5 and 7) of a return kicker block 123. Upon engagement of such kicker arm 101 with the lateral arm 122, and with the upward movement of the shaft 90 of said kicker arm 101 on the ascending leg of its cyclic path, said shaft is caused to rotate in a counterclockwise direction, as viewed in Fig. 5, and in consequence the row of fingers 91 on said shaft are returned to a normal dependent position. The return kicker block 123 is rigidly secured to the swing frame member 50 by the bolts 60. The lateral arm 122 of the return kicker block 123 is located relative to the cam 114 in such a manner to positively prevent interference by said lateral arm with the flipping movement of the row of nut pick-up fingers 91 then in current engagement with the cam 114. Therefore, contact of the lateral arm 122 by the kicker arm 101 of the above mentioned row of nut pick-up fingers 91 is only effected subsequent to the completion of the flipping movement of such row of fingers. Moreover, the location of the lateral arm 122 of the return kicker block 123 relative to the cam 114 is such that no interference occurs between the row of nut pick-up fingers 91 being returned thereby to a normal position, as hereinbefore described, and the succeeding row of nut pick-up fingers 91 currently undergoing a nut flipping movement.

At this time reference is again had to the depth or gauge wheels 54 and 55, and it is important here to note that such wheels serve to accurately gauge the nut gathering mechanism B regardless of ground contour. Hence, it is highly desirable that these wheels be located both horizontally and vertically in relation to the nut gathering instrumentalities of the nut gathering mechanism B and in relation to the cam 114, so as to assure effective and proper contact of said instrumentalities with the ground, irrespective of the nature of the latter, i. e., whether the nut harvester is operating over sandy soil or over hard clay.

The nut conveying mechanism C (Figs. 1, 2 to 4, 9, 11 and 19) is adapted to receive the nuts gathered by the nut gathering mechanism B, and for this purpose said nut conveying mechanism is mounted forwardly of said nut gathering mechanism in adjacent parallel relation thereto.

The conveying instrumentalities of the mechanism C are mounted upon a transversely supported frame 125, which essentially consists of a pair of channel members 126 and 127, respectively, rigidly secured in spaced parallel and face to face relation by a floor plate 128 bolted at its flanged sides to the inner faces of said channel members at a point thereon substantially midway their height. The floor plate 128 is of such length so as to be substantially coextensive with the length of the nut gathering mechanism B, for a purpose hereinafter made more apparent.

Journalled for rotation, in any suitable manner, within the left-hand end of the support frame 125 (Fig. 11) is an idler shaft 129, and fixedly secured to said idler shaft adjacent the journalled ends thereof are sprocket wheels 130 and 131, respectively. Journalled for rotation in any appropriate manner upon the overhanging right-hand end of support frame 125 is a drive shaft 132, and fixedly secured to said drive adjacent the journalled ends thereof are sprocket wheels 133 and 134, respectively. Trained around the sprocket wheels 130—133 and 131—134 are endless sprocket chains 135 and 136, respectively. The upper reaches of the endless sprocket chains 135 and 136 are normally in contact with the upper face of the floor plate 128 and are so maintained by suitable means at the left- and right-hand ends of said floor plate, as for example, at the left-hand thereof by idler sprockets 137 and 138, respectively, which are rotatably mounted upon a shaft 139 fixedly secured at its ends to the sides of the support frame 125, and at the right-hand end of the floor plate 128 by idler sprockets 140 and 141, respectively, which are suitably mounted in axially aligned relation for rotation upon the sides of the support frame 125. Interposed between the endless sprocket chains 135 and 136 at uniform spaced intervals are nut conveying flights 142, which are rigidly secured at the ends thereof to said chains.

To protect the upper reaches of the endless sprocket chains 135 and 136 and to prevent clogging of same with dirt or other debris, shields 143 and 144, respectively (Fig. 9), are provided therefor. These shields 143 and 144 extend lengthwise along the forward and rear sides of the support frame 125 a distance substantially equivalent to the length of the nut gathering mechanism B. The shields 143 and 144 comprise upwardly extending angular members 145 and 146, respectively, the vertical legs of which abut the outer faces of the channel members 126 and 127 and are rigidly secured to said members by bolts 147 and 148, respectively, while the generally horizontal legs of said members extend inwardly to overhang in vertically spaced relation their respective channel members 126 and 127. Supported in cantilever fashion from the generally horizontal legs of the angular members 145 and 146 and fixedly secured thereo, as by riveting, to extend downwardly and inwardly therefrom are curved flexible guard strips 149 and 150, respectively. These guard strips may be fabricated from any flexible material, such as leather or rubber belting, or the like.

An angular nut deflector panel 151, which is substantially coextensive with the nut gathering mechanism B, as shown in Fig. 1, is provided to deflect any nuts into the conveyor mechanism C which are not directly tossed thereinto by said nut gathering mechanism. The angular nut deflector panel 151 is operatively mounted upon the support frame 125 with its upper edge in flush relation with the upper face of the generally horizontal leg of the angular member 146. When the nut deflector panel 151 is thus mounted upon the support frame 125, the vertical leg of said panel abuts the corresponding leg of the angular member 146 and is jointly secured with the latter to said frame 125 by the bolts 148. The nut deflecting leg of the panel 151 extends downwardly and rearwardly from the upper edge of the latter a sufficient distance to assure that any and all nuts not directly tossed into the conveyor mechanism C are deflected thereinto.

As frequently occurs some nuts are not tossed by the nut gathering mechanism B into the nut conveying mechanism C, but are rolled forwardly along the ground by said gathering mechanism. Therefore, to prevent the dispersal and loss of such nuts a flexible curtain 152, of cotton duck or the like, is provided. This curtain 152 is substantially coextensive with the nut gathering mechanism B, as shown in Fig. 1, and at its upper edge is jointly secured with the vertical leg of the nut deflector panel 151 and the corresponding leg of the angular member 146 to the support frame 125 by the bolts 148. The curtain 152 hangs vertically from its above described support and the lower edge portion thereof is normally in trailing contact with the ground, as shown in Fig. 9.

To prevent any nuts from being tossed over and beyond the nut conveying mechanism C, an arched shroud 153, which is adapted to extend upwardly and rearwardly over said conveying mechanism in vertically spaced relation thereto is provided for such purpose. The shroud 153 is of such length as to be coextensive with the nut gathering mechanism B, see Figs. 1 and 2, and is operatively supported from the frame 125 by rigidly securing the forward lower marginal portion thereof together with the vertical leg of the angular member 145 to said frame 125 by the bolts 147. To stiffen the arch of the shroud 153 the left-hand end of the latter is provided with an end wall 154.

Rigidly secured to the underside of the nut conveying mechanism C in spaced parallel relation are a pair of skids 155, which serve to cause said conveying mechanism to ride over any obstruction encountered thereby during nut harvesting operations.

It should be pointed out at this time that the nut pick-up instrumentalities of the nut gathering mechanism B together with the cam 114 are so located relative to the nut conveying mechanism C, see Fig. 9, as to cause a larger percentage of the nuts to be tossed directly into the said conveying mechanism.

The hoisting mechanism D (Figs. 1 to 4 and 9) is adapted to first elevate the nut conveying mechanism C independently of the nut gathering mechanism B, and to sequentially elevate both such nut conveying and gathering mechanisms, i. e., the independent elevation of said nut conveying mechanism C is to clear ground rises and obstructions without changing the relationship of the nut gathering mechanism B to the ground, while the joint elevation of said nut conveying and nut gathering mechanisms is to permit transit of the nut harvester from one location to another over highways, roadways, or the like.

The hoisting mechanism D is provided with a pair of longitudinally disposed, spaced parallel lift arms 156 and 157, respectively, which lift arms are pivoted at their rear ends upon a common pivot shaft 158 (Figs. 1 to 4) which is transversely journalled upon the harvester frame 30. The lift arms 156 and 157 are interconnected in rigid spaced parallel relation, to raise and lower as a unit, by spaced parallel cross tie-bars 159 and 160, respectively. The lift arms 156 and 157 are pivotally connected at their forward outer ends to the upper ends of posts 161, which latter at their lower ends are fixedly secured by bolts 162 to forwardly extending gussets 163 rigidly secured in any suitable manner to the frame 125 of the nut conveying mechanism C.

The lift arms 156 and 157 are raised and lowered hydraulically, and for this purpose a hydraulic cylinder 164 is pivotally mounted, in a manner not shown, upon the forward end of the harvester frame 30, see Figs. 3 and 4. A piston rod 165 reciprocatively mounted within said hydraulic cylinder is pivotally connected at its upper outer end to the underside of the cross tie-bar 160, as by a pivot pin 166. The lower end of the hydraulic cylinder 164 is connected by piping 167 to a pump 168, said piping having a manually controlled valve 169 interposed therein for selectively connecting the hydraulic cylinder 164 with either the suction or discharge side of the pump 168, in accordance with operational requirements. The pump 168 is operably connected by a belt drive 170 with the crankshaft 36 of the vehicle propelling engine 35.

As hereinbefore described the nut conveying mechanism C may be partially elevated independently of the nut-gathering mechanism B. To achieve this end the swing frame members 50 and 51 are tied together upon their upper faces and at a point substantially midway their length by a cross channel 171. At points directly beneath the lift arms 156 and 157 the upper flange of the channel 171 is perforated to receive the lower hooked terminals 172 of generally vertical lift rods 173. The upper portions of these rods are threaded and extend through suitable apertures in the lift arms 156 and 157 to project above the latter a predetermined distance and at their upper terminals are provided with limit nuts 174. This predetermined distance permits of the partial elevation of the nut conveying mechanism C independently of the nut gathering mechanism B, as shown by dotted lines in Fig. 3.

To partially sustain the weight of the nut gathering mechanism B and to that extent thereby relieve the depth or gauge wheels 54 and 55 of same, a pair of helical tension springs 175 are provided. These springs are hooked at their lower ends to the upper flange of the cross channel 171 in any suitable manner, and at their upper ends are similarly hooked to dependent lugs 176 carried by the lift arms 156 and 157. The tension of the springs 175 is such as to permit of the nut gathering mechanism B remaining in effective and proper contact with the ground.

It should be observed that the pivotal mountings 52—53 and 158 of the nut gathering mechanism B and the nut conveying mechanism C, respectively, relative to the front driving wheels 31—32 of the nut harvester are proportionately such, see Fig. 4, as to assure ample ground clearance for both of said mechanisms regardless of any variations in highway or roadway contours.

The nut elevating mechanism E (Figs. 1, 2, 11 and 19) is operatively mounted in any suitable manner upon the right-hand side of the nut harvester to extend lengthwise thereof. The generally horizontal lower portion of said elevating mechanism E extends forwardly between the divergent upper and lower reaches of the sprocket chains 135—136 at the overhanging right-hand end of the nut conveying mechanism C, as best shown in Figs. 11 and 19.

The nut elevating mechanism E is provided at its lower end with a transversely disposed idler shaft 177 having its ends journalled for rotation within the support frame 125 of the nut conveying mechanism C at a point somewhat forwardly thereof, see Figs. 2 and 19. Fixedly secured in axially spaced relation upon the shaft 177 are idler sprocket wheels 178 and 179, respectively. A transversely disposed drive shaft 180 is provided at the upper, rear end of the nut elevating mechanism E, which shaft is journalled for rotation at its ends within an elevating mechanism mounting frame 181 suitably supported upon the frame 30 of the nut harvester. Fixed in axially spaced relation upon the shaft 180 are drive sprocket wheels 182 and 183, respectively. Trained around the sprocket wheels 178—182 and 179—183 are endless sprocket chains 184 and 185, respectively. Interposed between the endless sprocket chains 184 and 185 at uniform spaced intervals are nut conveying flights 186, which are rigidly secured at their ends to said chains. The flights 186 upon the upper reaches of the endless sprocket chains 184 and 185 normally cooperate with and slide over a slatted floor plate 187, which is mounted upon the frame 181 in any well-known manner, not shown. To maintain the upper reaches of the endless sprocket chains 184 and 185 normally in contact with the slatted floor plate 187 idler sprocket wheels 188 and 189, respectively, are provided, which respectively engage said sprocket chains 184 and 185 at the juncture of the generally horizontal and inclined portions thereof. The idler sprocket wheels 178 and 179 are rotatably mounted in axially aligned relation upon the sides of the mounting frame 181.

Operably supported upon the upper rear end of the mounting frame 181 to receive the nuts elevated by the nut elevating mechanism E is a downwardly and rearwardly directed chute 190. A blower fan 191 carried by the harvester frame 30 is provided with a blower duct 192, which is disposed transversely of the chute 190 to discharge a continuous stream of air across said chute 190, and thus eliminate leaves, small twigs or the like from the nut crop as it passes downwardly and rearwardly in the chute 190.

The nut cleaning and screening mechanism F is operatively mounted upon the rear end and right-hand side of the nut harvester frame 30 in longitudinally aligned relation with the nut elevating mechanism E and its discharge chute 190. The nut cleaning and screening mechanism E is of the squirrel-cage type and essentially consists of an inner coarse screening cage 193 and an outer fine screening cage 194, both of which are preferably of cylindrical formation and are arranged in concentric shaped and substantially coextensive relation.

The inner and outer screening cages 193 and 194 are mounted to rotate jointly, accordingly said cages have common annular end plates 195 and 196, respectively. The inner coarse screening cage 193 is formed by a plurality of uniformly spaced rods 197 arranged in circular formation with the terminals thereof rigidly secured to the inner marginal portion of the annular end plates 195 and 196. The outer fine screening cage 194 is formed by a plurality of uniformly spaced rods 198 and 199 arranged in circular formation with their forward terminals rigidly secured to the outer marginal portion of the annular end plate 195, while only the rear terminals of the rods 198 are rigidly secured to the marginal portion of the annular end plate 196. The rear terminals of the rods 199 are rigidly secured to an intermediate annular plate 200 (Fig. 20) to thus provide nut discharge openings 201 at the rear end of the outer fine screening cage 194, which openings are defined by the end annular plate 196, rods 198 and the intermediate annular plate 200. For all practical purposes every third rod of the outer fine screening cage 194 is designated as a rod 198. By referring particularly to Fig. 22, it will be observed that the rods 197 of the coarse inner screening cage 193 are somewhat larger in diameter and are spaced further apart than are the rods 198 and 199 of the fine outer screening cage 194. Rigidly secured to the rods 197 of the inner screening cage 193 is a helically formed web 202, which serves to move the nuts and coarser debris lengthwise therein during the screening out of the nuts and debris of equivalent size or smaller, and also serves to finally effect discharge of the coarse debris, such as large clods, rocks, or the like from the open rear end of said inner screening cage. Interposed between the inner and outer screening cages 193 and 194 and rigidly secured to the respective rods thereof is a helically formed web 203, which serves to move the nuts and debris of substantially equivalent size lengthwise therein during the screening out of the finer debris and also serves to finally effect discharge of the nuts and debris of equivalent size through the openings 201 at the rear end of said outer screening cage.

The chute 190 is arranged to register with the forward end of the inner screening cage 193 to thus deliver the nut crop and accompanying debris thereto, while the rear end of said cage 193 is provided with a discharge sleeve extension 204, wherethrough the coarse debris discharged by the inner screening cage, such as clods, rocks, or the like, passes for deposit upon the ground.

The dual screening cage assembly above described is cradled for rotation by seating the outer marginal portions of the annular end plates 195 and 196 of said cage assembly within annularly grooved rollers 205 (Fig. 21) which are rotatively journalled in bearings 206 fixedly secured in laterally and longitudinally aligned spaced relation upon the harvester frame 30.

To effect rotation of the dual screening cage assembly a pair of endless V-belts 207 are trained around the outer screening cage 194, at a point substantially midway the length thereof, which V-belts are also trained around a double V-belt pulley 208 fixedly secured to the forward end of a longitudinally disposed jackshaft 209 rotatively mounted in any suitable manner upon the harvester frame 30. Fixed to the rear end of the jackshaft 209 is a sprocket wheel 210 having an endless sprocket chain 211 trained therearound, which sprocket chain is also trained around a sprocket wheel 212 fixed to a driving shaft 213 adapted to receive power in a manner and from a source hereinafter described.

The nut discharging mechanism G (Figs. 1, 2, 20 and 21) is operatively mounted upon the rear end of the harvester frame 30 to extend transversely thereof in an upwardly and inclined manner, and is adapted to receive the nuts and debris of equivalent size from the discharge openings 201 of the outer screening cage 194 and convey said nuts and debris to a loading point described later herein.

As herein contemplated the nut discharging mechanism G is adapted to be enclosed by and operatively mounted within an inclined housing 214 supported in any suitable manner from the harvester frame 30. The inclined housing 214 is supported upon said frame 30, in such a manner so that the upper face of the lower end portion thereof is substantially disposed in tangential relation to the periphery of the outer screening cage 194 adjacent the underside thereof, as shown in Fig. 21. In addition to enclosing the nut discharging mechanism G the inclined housing 214 also encloses a major portion of the rear end of the outer screening cage 194 having the circular row of nut discharge openings 201. For this purpose the upper face of the lower end portion of said housing 214 is provided with a generally circular band 215 having a chute portion 216 (Fig. 22) leading from the underside thereof for effecting discharge of the nuts and debris of equivalent size onto the lower end of the nut discharging mechanism G.

A conveying mechanism 217 operably mounted within the inclined housing 214 serves to elevate the nuts and debris of equivalent size from the nut and debris receiving lower end of said housing to the nut and debris unloading end thereof. The conveying mechanism 217 includes in part an idler shaft 218 rotatably mounted within the lower end portion of the housing 214, a driving shaft 219 similarly mounted within the upper end portion of said housing, endless sprocket chains 220 having nut and debris conveying flights 221 attached thereto and a floor plate 222 upon which the flights 221 carried by the upper reaches of said sprocket chains are adapetd to slide, as shown in Fig. 21. To drive the conveying mechanism 217, the driving shaft 219 of same is connected by a sprocket drive 223 (Fig. 20) to the forward end of a longitudinally disposed jackshaft 224 rotatably mounted in any suitable manner upon the harvester frame 30 and provided at its rear end with a sprocket wheel 225 (Fig. 21) adapted to normally mesh with the lower reach of the sprocket chain 211. The nuts and debris of equivalent size are retained upon the conveying mechanism 217 during their upward movement upon the floor plate 222 by vertically rising wings 226, which also serve to brace the inclined housing 214 and its associated circular band 215.

Mounted upon the upper end of the inclined housing 214 in rearwardly offset relation thereto is a downwardly directed sacking chute 227 having a bifurcated lower end to provide twin sack receiving outlets 228 and 229, respectively. The outlets 228 and 229 are provided with conventional clamps 230 and 231, respectively, for securing the necks of sacks thereto during nut loading operations. The sacking chute 227 is provided with selector means 232 for diverting the nuts either to the outlet 228 or the outlet 229. Fixedly secured to and depending from the rear end of the harvester frame 30, in substantially aligned relation with the sacking chute 227, is a platform 233 upon which the sack loader is adapted to stand during sack loading operations.

The drive means H (Fig. 19) is common to and is adapted to actuate the nut gathering mechanism B, the nut conveying mechanism C, the nut elevating mechanism E, the nut cleaning and screening mechanism F including the blower fan 191, and the nut discharging or unloading mechanism G.

As herein shown, the drive means H is provided with a harvesting mechanism engine 234, which is arranged to operate at a set speed and which is operatively mounted upon the harvester frame 30 in any suitable manner, not shown. The engine crankshaft 235, at one end thereof, is connected by a sprocket drive 236 to one end of a transversely disposed main jackshaft 237 rotatively mounted in any well-known manner upon the harvester frame 30. The main jackshaft intermediate its length is connected by a sprocket drive 238 to a transversely disposed auxiliary jackshaft 239 rotatively mounted in any conventional manner upon the harvester frame 30. A sprocket drive 240 connects the auxiliary jackshaft 239 with the drive shaft 76 of the nut gathering mechanism B.

The main jackshaft 237, at the end opposite that of the sprocket drive 236, is connected by a sprocket drive 241 to one end of a transversely disposed auxiliary jackshaft 242 rotatably mounted upon the harvester frame 30 in any suitable manner. The other end of the jackshaft 242 is connected by a sprocket drive 243 to the transversely disposed power input shaft 244 of a gear box 245, from which the driving shaft 213, of the nut cleaning and screening mechanism F and the nut discharge mechanism G, derives power.

The power input shaft 244, at a point intermediate its length, is connected by a sprocket drive 246 to the outer end of a transversely disposed elevator jackshaft 247 appropriately journalled upon the frame 181 of the nut elevating mechanism E. The elevator jackshaft 247 is connected by a sprocket drive 248 to the driving shaft 180 of the nut elevating mechanism E.

A power output shaft 249 (Fig. 2) extends forwardly from the gear box 245 and is connected through a universal joint 250 to a downwardly inclined and forwardly extending shaft 251, which in turn is connected by a universal joint 252 to the driving shaft 132 of the nut conveying mechanism C.

The blower fan 191 is driven by the engine 234, accordingly, said fan 191 is connected by a chain drive 253 to the end of the engine shaft 235 opposite that of the sprocket drive 236, as shown more clearly in Fig. 19.

As hereinbefore pointed out and as will be clearly apparent by referring to Figs. 1 and 2, all of the controls for manipulating the nut harvester and its several mechanisms are located conveniently to and within easy reach of the nut harvester operator when he is seated upon the operator's seat 43.

In the operation of the present nut harvester, assuming the same has to be moved from a parking point to the orchard to be harvested, the operator after being seated upon the seat 43 starts the propelling engine 35 to drive the pump 168 supplying fluid pressure to the hydraulic cylinder 164, after which he manipulates the control valve 169 to effect joint elevation of the nut gathering mechanism B and nut conveying mechanism C to their inoperative position shown in Fig. 4. Meanwhile, the nut sacking operator takes his position upon the platform 233. The harvester operator next selects the desired gear speed and then engages the vehicle clutch and proceeds to the orchard. Upon reaching the orchard the operator starts the harvesting mechanism engine 234 and then jointly lowers the nut gathering mechanism B and nut conveying mechanism C to their operative position shown in Fig. 3. The operator next engages the clutch of the engine 234 to activate the several nut harvesting mechanisms. With the nut gathering and conveying mechanisms in their operative position, the operator proceeds through the orchard and as he moves therethrough the nut gathering mechanism B tosses the nuts and miscellaneous debris onto the nut conveying mechanism C in the manner hereinbefore described. The nut conveying mechanism C then carries the nuts and debris toward the nut elevating mechanism E and upon reaching the latter the nuts and a certain amount of debris drop onto said nut elevating mechanism E, while the balance of the debris consisting mainly of longer twigs, sticks, or the like is discharged outboard onto the ground. As hereinbefore described, the nut elevating mechanism E is slatted so that any fine debris drops through the slats thereof during the passage of the nuts thereover. Upon reaching the upper end of the nut elevating mechanism E, the nuts and remaining debris pass downwardly and rearwardly within the chute 190 and while so passing leaves, small twigs, or the like are eliminated by the continuous stream of air created by the blower fan 191 blowing across said chute. After the nuts and the debris, such as clods, rocks, or the like have traversed the chute 190, said nuts and debris enter the open intake end of the inner screening cage 193 of the cleaning mechanism F and are conveyed therethrough by the helical web 202. During transit of the nuts and debris within the inner screening cage 193, the nuts and debris of equivalent size or smaller, drop therefrom between the rods 197 thereof into the outer screening cage 194, thus leaving only the larger clods, rocks, or the like in said inner screening cage 193, which are discharged from the rear end thereof through the discharge sleeve extension 204 of same for deposit on the ground. After the nuts and debris of equivalent size or smaller drop into the outer screening cage 194, they are moved therealong by the helical web 203 thereof, meanwhile, the debris smaller than the nuts drops from the cage 194 between the rods 198 and 199 thereof to the ground. The nuts and the small amount of debris of equivalent size continue to move toward the rear end of the outer screening cage 194 and upon reaching said end drop from said cage through the discharge openings 201 thereof onto the lower end of the conveying mechanism 217 and are elevated thereby to the loading chute 227. In preparation for the discharge of the nuts from the harvester, the sacking operator has meanwhile clamped sacks upon the twin sack receiving outlets 228 and 229, and has manipulated the selector means 232 to effect discharge of the nuts through the selected outlet into the sack clamped thereto. After such sack is filled the sacking operator again manipulates the selector means 232 to effect filling of the other sack, and then removes the filled sack by releasing the clamp thereof, and sets such filled sack aside on the platform 233, or deposits same on the ground. He then positions upon and clamps a fresh empty sack to the sack receiving outlet from which the filled sack has been removed. As alternate sacks are filled the above operations are continued until the entire nut crop has been harvested.

After completion of a nut harvesting operation, the sacked nuts are taken to a cleaning shed where any debris of equivalent size is removed therefrom prior to their being stored or shipped.

While we have shown and described a preferred embodiment of the present invention, it will be understood that various changes and modifications may be made without departing from the spirit of the invention and the scope of the appended claims.

Having thus described the present invention and the manner in which the same is to be used, what we claim as new and desire to protect by Letters Patent is:

1. In a nut gathering mechanism, the combination of: a rotatable shaft, and a resilient nut pick-up finger mounted in unstressed condition on said shaft for limited rotative self adjusting gravitational movement relative thereto.

2. In a nut gathering mechanism, the combination of: a rotatable shaft, and a resilient nut pick-up finger having a coiled end portion mounted in unstressed condition on said shaft for limited rotative self adjusting gravitational movement.

3. In a nut gathering mechanism, the combination of: a rotatable shaft having a longitudinally disposed groove formed within the periphery thereof, a resilient U-shaped nut pick-up finger including a pair of spaced legs with end portions rotatably mounted upon said shaft, inwardly extending projections on said end portions seated within said groove and normally disposed against one edge only of said groove, the size of said projections in relation to the width of said groove being such as to permit of only limited substantially unstressed rotative movement of said U-shaped finger upon said shaft, and means for causing relative movement between said shaft and said finger to first move said projections against a wall of said groove and hold said finger in a substantially unstressed condition and thereafter for rotating said shaft relative to said finger to wrap said finger in stressed condition around said shaft.

4. In a nut gathering mechanism, the combination of: a rotatable shaft having a longitudinally disposed groove formed within the periphery thereof, a resilient U-shaped nut pick-up finger having substantially parallel legs with end portions thereof helically wound and rotatable upon said shaft with the extremities of said portions bent inwardly in substantially radial relation to the axis of said shaft to seat within the groove thereof and normally disposed in contact against one edge only of said groove, the size of said extremities in relation to the width of said groove being such as to permit of only limited substantially unstressed rotative movement of said U-shaped finger upon said shaft, weight means on said shaft for normally holding said finger extremities in contact with said one edge of said groove, and kicker means cooperating with said weight means for rotating said shaft for torsionally stressing said finger on said shaft and for imparting a nut flipping motion to said finger.

5. In a nut gathering mechanism, the combination of: a rotatable shaft having a groove formed lengthwise within the periphery thereof, and a plurality of resilient nut pick-up fingers individually mounted in unstressed condition upon said shaft for independent rotative movement relative to each other, each of said fingers having an inwardly extending projection seatable within the groove of said shaft, the relative size of said projection and the width of said groove being such as to permit of only limited rotative self adjusting gravitational movement of each finger upon said shaft, the rotated position of said groove being determined by the gravitational movement of the major portion of said fingers, allowing each individual finger to independently rotate downwardly through said limited movement to follow ground contours without interference with the other fingers.

6. A nut harvester comprising a vehicle, a nut gathering mechanism pivotally mounted upon the forward end of said vehicle to extend forwardly therefrom, a series of resilient nut pick-up fingers carried by said nut gathering mechanism and arranged to move in a substantially elliptical path having a straight lower run, said fingers being adapted to travel in the direction of vehicle movement while in said straight lower run, and means mounted upon the forward end and at one side of said nut gathering mechanism for maintaining said mechanism at a selected uniform distance relative to the ground regardless of variation in ground contour to hold the major portion of said nut pick-up fingers in effective nut gathering contact with the ground while said fingers are in the lower run of said elliptical path, said fingers being mounted on said mechanism for free self-adjusting movement over a fixed range relative to said mechanism so as to allow each individual finger to gently gravitate into contour depressions in its path.

7. In a nut gathering mechanism, the combination comprising a frame, a shaft having a longitudinally disposed groove formed in the periphery thereof, said shaft being supported by said frame and mounted to move in a predetermined path and to also rotate about its axis, a nut pick-up finger supported by said shaft and including a helically wound resilient connecting member positioned around said shaft, an inwardly extending projection on said resilient member disposed in said groove and having a width smaller than the transverse width of said groove permitting a limited amount of rotative movement relative to said shaft to effect tensioning of the resilient member upon rotation of said shaft, kicker means fixedly secured to said shaft for movement therewith, fixed means mounted on said frame to lie in the path of said kicker means and to be engaged thereby to rotate said shaft and tension said resilient connecting member, and a second fixed means mounted on said frame to lie outside but closely adjacent said path in position to be contacted by said kicker means only in the event the same is thrown outwardly from its path during a shaft rotating movement of the kicker means whereby said kicker means and its correlated nut pick-up finger is returned to their normal path of travel.

References Cited in the file of this patent
UNITED STATES PATENTS

| | | |
|---|---|---|
| Re. 2,032 | Sprout | July 18, 1865 |
| 333,299 | Higgins | Dec. 29, 1885 |
| 352,884 | Nye | Nov. 16, 1886 |
| 481,895 | Coldwell | Aug. 30, 1892 |
| 847,685 | Pavert | Mar. 19, 1907 |
| 1,666,370 | Detwiler | Apr. 17, 1928 |
| 1,903,577 | Struever | Apr. 11, 1933 |
| 2,129,452 | Van Sickle | Sept. 6, 1938 |
| 2,172,655 | Gallagher et al. | Sept. 12, 1939 |
| 2,242,077 | Jones | May 13, 1941 |
| 2,259,908 | Raney | Oct. 21, 1941 |
| 2,284,777 | Sund | June 2, 1942 |
| 2,347,907 | Hill | May 2, 1944 |
| 2,481,528 | Nolt | Sept. 13, 1949 |
| 2,508,454 | Goodwin | May 23, 1950 |
| 2,514,945 | Foatier | July 11, 1950 |
| 2,573,210 | Madsen | Oct. 30, 1951 |
| 2,615,296 | Lemanski | Oct. 28, 1952 |
| 2,640,306 | Diehl | June 2, 1953 |